US011315089B2

(12) United States Patent
Byington et al.

(10) Patent No.: US 11,315,089 B2
(45) Date of Patent: Apr. 26, 2022

(54) USER CONFIGURABLE DIRECT TRANSFER SYSTEM

(71) Applicant: Apple Inc., Cupertino, CA (US)

(72) Inventors: Matthew C. Byington, Sunnyvale, CA (US); Yousuf H. Vaid, Fremont, CA (US); Jenna Yi, San Jose, CA (US); Christopher Sharp, San Jose, CA (US); Richard William Thomas Heard, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 47 days.

(21) Appl. No.: 16/403,414

(22) Filed: May 3, 2019

(65) Prior Publication Data

US 2019/0370762 A1 Dec. 5, 2019

Related U.S. Application Data

(60) Provisional application No. 62/679,721, filed on Jun. 1, 2018.

(51) Int. Cl.
*G06Q 20/10* (2012.01)
*G06Q 20/38* (2012.01)
*G06Q 20/40* (2012.01)

(52) U.S. Cl.
CPC .......... *G06Q 20/10* (2013.01); *G06Q 20/385* (2013.01); *G06Q 20/40* (2013.01)

(58) Field of Classification Search
None
See application file for complete search history.

(56) References Cited

U.S. PATENT DOCUMENTS

| 8,583,496 | B2* | 11/2013 | Yoo | G06Q 20/108 |
| | | | | 705/17 |
| 10,275,756 | B2* | 4/2019 | Uzo | G06Q 20/305 |
| 10,318,936 | B2* | 6/2019 | Muthu | G06Q 20/385 |
| 2001/0051917 | A1* | 12/2001 | Bissonette | G06Q 20/105 |
| | | | | 705/39 |
| 2011/0055077 | A1* | 3/2011 | French | G06Q 20/04 |
| | | | | 705/39 |
| 2011/0258686 | A1* | 10/2011 | Raj | G06Q 20/10 |
| | | | | 726/6 |
| 2013/0018785 | A1* | 1/2013 | Dolphin | G06Q 20/10 |
| | | | | 705/40 |
| 2013/0110678 | A1* | 5/2013 | Vigier | G06Q 20/20 |
| | | | | 705/26.61 |

(Continued)

*Primary Examiner* — Christopher Bridges
(74) *Attorney, Agent, or Firm* — BakerHostetler

(57) ABSTRACT

A device implementing a user configurable direct transfer system may include at least one processor configured to receive, from an electronic device associated with a user account, a request to establish a type of transfer between a first account associated with an entity and a second account associated with the user account, the request including an entity identifier and a transfer type identifier. The at least one processor may be further configured to generate a transfer alias that is stored in association with the entity identifier, a second account identifier, and the transfer type identifier, and provide the transfer alias to the electronic device and a server associated with the entity to facilitate the type of transfer between the first account associated with the entity and the second account associated with the user account.

20 Claims, 9 Drawing Sheets

(56) References Cited

U.S. PATENT DOCUMENTS

| | | | | |
|---|---|---|---|---|
| 2013/0159939 A1* | 6/2013 | Krishnamurthi | ........ | G06F 3/011 |
| | | | | 715/863 |
| 2013/0282588 A1* | 10/2013 | Hruska | ................. | G06Q 20/40 |
| | | | | 705/67 |
| 2014/0074714 A1* | 3/2014 | Melone | ................. | G06Q 20/00 |
| | | | | 705/44 |
| 2015/0142671 A1* | 5/2015 | Dicker | ................. | G06Q 20/382 |
| | | | | 705/75 |
| 2016/0307170 A1* | 10/2016 | Harkey | ................. | G06Q 50/01 |
| 2017/0011406 A1* | 1/2017 | Tunnell | ................. | H04W 12/06 |
| 2021/0049577 A9* | 2/2021 | Wilson | ................. | G06Q 20/32 |

* cited by examiner

USER CONFIGURABLE DIRECT TRANSFER SYSTEM

CROSS-REFERENCE TO RELATED APPLICATIONS

The present application claims the benefit of U.S. Provisional Patent Application Ser. No. 62/679,721, entitled "User Configurable Direct Transfer System," filed on Jun. 1, 2018, which is hereby incorporated by reference in its entirety for all purposes.

TECHNICAL FIELD

The present description relates generally to transfer systems, including a user configurable direct transfer system.

BACKGROUND

Fund transfers can be effectuated by different mechanisms, such as direct deposits, wire transfers, physical checks, debit/credit cards, and the like. Direct deposits and wire transfers typically involve a transaction (or clearing/settlement) period ranging from one to several business days. Physical checks have similar transaction periods that may be longer than those for direct deposits or wire transfers. In addition, an entity that disburses funds through physical checks may need a particular infrastructure in place to comply with applicable local and/or national regulations, which may increase the overall cost of using physical checks to transfer funds. Similarly, direct deposits, wire transfers, and/or debit/credit cards may involve one or more intermediaries, such as merchant acquirers, payment networks, clearinghouses, and the like, that may each collect per transaction fees, which may increase the overall cost of using these mechanisms to transfer funds as well as the length of time required for settlement.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
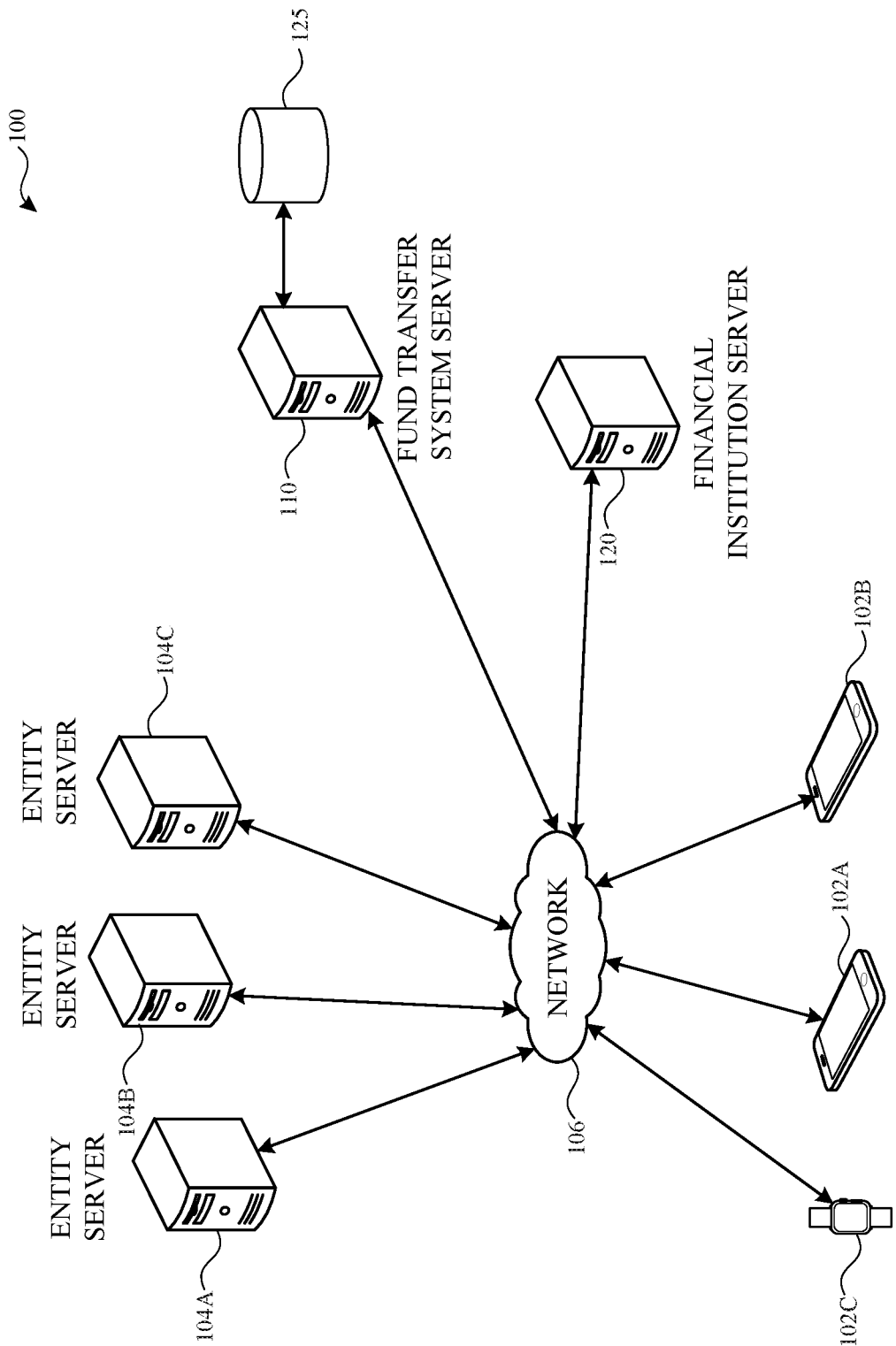
FIG. 1 illustrates an example network environment in which a user configurable direct transfer system may be implemented in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject user configurable direct transfer system provides users and entities, such as businesses, with a direct fund transfer mechanism that is immediate, private, secure, and user configurable/controlled. In the subject system implementations, a user can establish one or more different types of fund transfers with one or more different entities. The fund transfer system may operate in conjunction with (and/or may be part of) a financial institution that holds monetary accounts for the user and/or the entity. For example, the user may configure/control a direct disbursement by a given entity and/or a direct charge by the given entity. The direct disbursement allows the entity to transfer funds directly from the monetary account of the entity into the monetary account of the user, while the direct charge allows the entity to withdrawal funds directly from the monetary account of the user into the monetary account of the entity, such as to purchase an item.

When the user establishes a particular type of direct fund transfer with a particular entity, the subject fund transfer system generates a fund transfer alias that is provided to the user and the entity. The fund transfer alias is specific to the particular type of fund transfer and is specific to the particular entity, such that the user may generate and configure a separate fund transfer alias for each type of fund transfer established for each entity. The fund transfer aliases can be used by the user (or user device) and/or entity to initiate the fund transfers without needing to know the other's monetary account identifier (such as an account number, routing number, and the like). Thus, the privacy of both the user's and the entity's respective monetary account identifiers is preserved. Furthermore, since a separate fund transfer alias is established for each particular entity, it may be difficult or impossible for any single entity (or third party) to track the fund transfer activity of the user across different entities. The subject system may also enable a user to individually activate or deactivate each fund transfer alias for each entity. For example, the subject system may provide the user with a user interface to individually (or separately) activate or deactivate each fund transfer alias for each entity. However, the subject system may also provide a user interface having the capability to activate/deactivate more than one fund transfer alias for one or more entities in a single operation.

In one or more implementations, an entity may provide a service to a user where the service is facilitated by a facilitating user (or provider or facilitator), such as a ride service (where the facilitating user is, e.g., the driver), a food delivery service, and the like. The entity may receive payment for the service from the user that received the service and the entity may provide payment to the facilitating user for facilitating (or providing) the service. Conventionally, the entity may pay the facilitating user periodically, such as weekly, monthly, and the like, using a conventional fund transfer mechanism that may be associated with the aforementioned overhead costs and/or latency. However, using the subject system the entity may immediately or much more quickly directly disburse funds into a monetary account of the facilitating user (assuming the facilitating user has established this type of fund transfer from the entity) once the payment is received from the user. For example, the entity may disburse a portion of the payment received from the user and/or, for example, any tip amount received from the user, directly into the monetary account of the facilitating user, upon receipt of the payment from the user (e.g., in real time or near real time). Further, the entity may disburse funds to the facilitating user more frequently. For example, funds may be disbursed on a per transaction basis, hourly, daily, etc.—instead of being disbursed weekly, bi-weekly, monthly, etc.

Furthermore, since the fund transfers of the subject system are performed directly between monetary accounts of entities and monetary accounts of users, no intermediaries, such as merchant acquirers, payment networks, clearinghouses, and the like are required to perform the fund transfers, thereby eliminating the additional fees conventionally associated with performing fund transfers through these entities. Accordingly, the subject system provides a fund transfer system that transfers funds immediately (or with decreased delay), privately, and directly, e.g. without utilizing fee incurring intermediaries. It will be understood that the fund transfers described herein are direct, e.g., do not involve intermediaries, even when not expressly described as direct fund transfers.

FIG. 1 illustrates an example network environment 100 in which a user configurable direct transfer system may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes one or more electronic devices 102A-C, a network 106, one or more entity servers 104A-C, one or more fund transfer system servers 110, a fund transfer system data store 125, and one or more financial institution servers 120. The network 106 may communicatively couple, for example, one or more of the electronic devices 102A-C to one or more of the servers 104A-C, 110, 120, and may communicatively couple any two or more of the servers 104A-C, 110, 120. In one or more implementations, the network 106 may be an interconnected network of devices that may include, or may be communicatively coupled to, the Internet.

One or more of the electronic devices 102A-C may be, for example, a portable computing device such as a laptop computer, a smartphone, a tablet device, a wearable device (e.g., watch, band, etc.), an audio device (e.g., a smart speaker), or other appropriate devices that include one or more wireless interfaces, such as one or more NFC radios, WLAN radios, Bluetooth radios, Zigbee radios, cellular radios, and/or other wireless radios. In FIG. 1, by way of example, the electronic devices 102A-B are depicted as mobile devices and the electronic device 102C is depicted as a smartwatch.

In one or more implementations, the electronic devices 102A-C may each include a secure element onto which one or more applets corresponding to, for example, bank accounts (e.g., debit card accounts) and/or credit card accounts of the associated users and/or entities, may be provisioned. An example electronic device that includes a secure element is discussed further below with respect to FIG. 2, and an example secure element is discussed further below with respect to FIG. 3. One or more of the electronic devices 102A-C may be, and/or may include all or part of, the electronic system discussed below with respect to FIG. 9.

The one or more fund transfer system servers 110 may include one or more servers that facilitate providing a fund transfer system to the electronic devices 102A-C and/or the entity servers 104A-C. The one or more fund transfer system servers 110 may include one or more trusted service manager (TSM) servers, one or more broker servers, one or more application servers, one or more storage system servers, and/or generally any server(s) that may facilitate providing a fund transfer system. The one or more fund transfer system servers 110 may utilize the fund transfer system data store 125 to store information corresponding to the fund transfer system, such as fund transfer aliases, account information, and the like. In one or more implementations, the fund transfer system data store 125 may be a cloud-based distributed storage system.

In one or more implementations, an authorized user of the electronic devices 102A,C may have a user account with the fund transfer system provided by the one or more fund transfer system servers 110 and an entity associated with the electronic device 102B, such as the entity corresponding to the entity server 104A, may have an entity account with the fund transfer system. User accounts and/or entity accounts may be used to configure and/or establish fund transfer aliases, e.g., via the one or more fund transfer system servers 110, as is discussed further below with respect to FIG. 6.

In one or more implementations, when (and/or after) a user account is established via the one or more fund transfer system servers 110, a corresponding user monetary account may be established with a financial institution via the one or more financial institution servers 120. The user monetary account may be, for example, a bank account, such as a federal deposit insurance corporation (FDIC) bank account. Similarly, when an entity (or business) account is established via the fund transfer system server 110, an entity monetary account may be established via the fund transfer system server 110. An example process of establishing an entity account via the fund transfer system server 110 is discussed further below with respect to FIG. 5, and the relationship and differences between entity accounts and user accounts with the fund transfer system are discussed further below with respect to FIG. 4.

The one or more financial institution servers 120 may include one or more trusted service manager (TSM) servers, one or more broker servers, one or more application servers, one or more storage system servers, and/or generally any server(s) that may facilitate services provided by a financial institution. In one or more implementations, the one or more fund transfer system servers 110 may communicate instructions, such as via an application programming interface (API) to the one or more financial institution servers 120. The instructions may include, for example, instructions to create an entity and/or user account, instructions to perform a fund transfer between two or more accounts, and the like.

In one or more implementations, the financial institution corresponding to the one or more financial institution servers 120 may be a separate business organization from the business organization that provides the fund transfer system. However, in one or more implementations, the fund transfer system may be provided by the financial institution, in which case the one or more fund transfer system servers 110 may be combined with the one or more financial institution servers 120. For explanatory purposes, the financial institution is described herein as being a bank, and the user and entity monetary accounts are described as being bank accounts. However, the financial institution may be any entity that holds monetary accounts for users and/or entities. In one or more implementations, the financial institution may be a decentralized distributed financial institution, such as a blockchain technology based financial institution. In this instance, the one or more financial institution servers 120 may be representative of any number of distributed computing devices spread across any geographic area.

The one or more fund transfer system servers 110 and/or the one or more financial institution servers 120 may be, and/or may include all or part of, the electronic system discussed below with respect to FIG. 9, and example processes of the one or more fund transfer system servers 110 are discussed further below with respect to FIGS. 5-7. For explanatory purposes, the one or fund transfer system servers 110 are generally described herein with reference to a single fund transfer system server 110, and the one or more financial institution servers 120 are generally described herein with reference to a single financial institution server 120.

The one or more entity servers 104A-C may correspond to one or more different entities. In one or more implementations, an entity may be a business organization that disburses funds to, or charges funds from, a monetary account of a user. For example, an entity may be a service provider that provides services to users or entities where the services are facilitated by other users, e.g., facilitating users. The entity may disburse funds into monetary accounts of one or more facilitating users, such as after receiving payment for the services from the users. In one or more implementations, the disbursement of funds into the monetary account of a facilitating user may be triggered by a payment being received from the user to whom the service was provided. For example, such a service provider may include a ride service provider, a food delivery service provider, a general contractor service provider, an insurance company (e.g., disbursing a claim), or generally any service provider that provides a service that is facilitated by a facilitating user. An example process performed by an entity server 104A that corresponds to a service provider is discussed further below with respect to FIG. 8.

In one or more implementations, an entity may be a merchant that charges funds from monetary accounts of users, e.g., for purchases, and/or disburses funds into monetary accounts of users, e.g., for product returns, refunds, and the like. In one or more implementations, an entity may be an employer that disburses funds into monetary accounts of employees, contractors, etc. In one or more implementations, an entity may be a state or local government that charges monetary accounts of users and/or entities, such as for tax payments, and disburses funds into monetary accounts of users and/or entities, such as for tax refunds, unemployment payments, and the like. In general, an entity may be any organization from which a user may wish to have funds disbursed into their monetary account and/or from which a user may wish to have funds charged from their monetary account.

Figure 2:
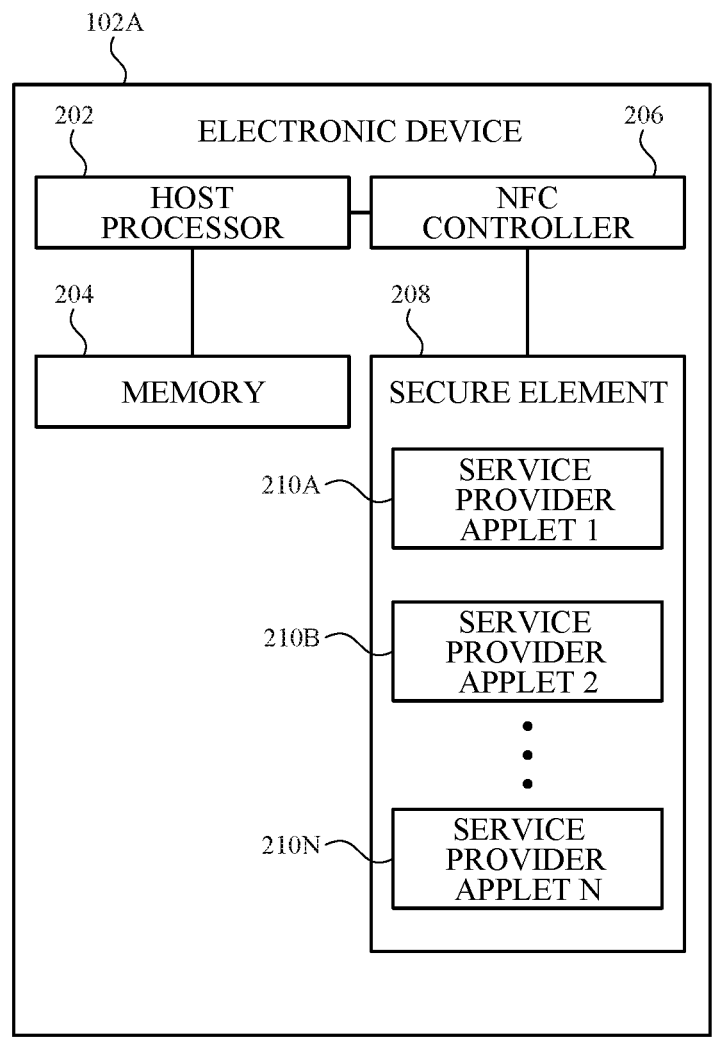
FIG. 2 illustrates an example electronic device that may be used in a user configurable direct transfer system in accordance with one or more implementations.

FIG. 2 illustrates an example electronic device 102A that may be used in a user configurable direct transfer system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. In one or more implementations, one or more components of the electronic device 102A may be implemented by one or more of the electronic devices 102B-C.

The electronic device 102A may include a host processor 202, a memory 204, an NFC controller 206, and a secure element 208. The secure element 208 may include one or more interfaces for communicatively coupling (directly or indirectly) to the NFC controller 206 and/or the host processor 202, such as via one or more single wire protocol (SWP) connections and/or any other data connection. The secure element 208 may include one or more provisioned service provider applets 210A-N, which may be referred to herein as applets 212A-N that may correspond to different service providers, such as credit card providers, debit card providers, financial institutions, transit providers, food/beverage providers, and the like. In one or more implementations, the operating system and/or execution environment of the secure element 208 may be a JAVA-based operating system and/or JAVA-based execution environment, and the applets 210A-N may be JAVA-based applets. In other implementations, other operating systems, languages, and/or environments can be implemented. In addition to the one or more applets 210A-N, the secure element 208 may also include one or more additional applets for performing other operations, such as a security applet, a registry applet, and the like.

The applets 210A-N may be provisioned on the secure element 208 in part by, for example, a trusted service manager server and/or a broker server, such as of the fund transfer system server 110 and/or the financial institution server 120. For example, the trusted service manager server and/or the broker server may transmit a provisioning script to the electronic device 102A via the network 106. In some implementations, the host processor 202 of the electronic device 102A may receive the script and may provide the script to the secure element 208, such as via the NFC controller 206 and/or directly to the secure element 208. The secure element 208 may perform one or more security mechanisms to verify the received script, such as one or more security mechanisms inherent in the GlobalPlatform framework, and may then execute the received script.

The execution of the script by the secure element 208 may cause one or more of the applets 210A-N to be provisioned on the secure element 208, such as an applet corresponding to a monetary account with the financial institution created for the fund transfer system. Each of the applets 210A-N may be provisioned with one or more of: an applet identifier, a device primary account number (DPAN), an identifier of the associated service provider, and/or one or more attributes. The applet identifier associated with a given applet 210A may be used by, for example, the host processor 202 and/or the trusted service manager server to uniquely identify the applet 210A relative to the other applets 210A-N provisioned on the secure element 208, such as to perform one or more operations with respect to the applet 210A. In one or more implementations, the applet identifiers may be used by the host processor 202 to store associations between the applets 210A-N and the corresponding service providers.

The DPAN may be associated with a card account, such as a credit card account and/or debit account (e.g., corresponding to a monetary account such as a bank account), that is associated with a given applet 210A. In contrast to the DPAN, the actual number that is printed on the physical card may be referred to as a funding primary account number (FPAN). When conducting a wireless transaction (e.g., a payment) using one of the applets 210A-N, the secure element 208 may provide the DPAN to a wireless transaction terminal (e.g., without providing the FPAN which may not be stored on the secure element 208). The wireless transaction terminal may then forward the DPAN to the associated service provider who can determine the account (e.g., the FPAN) associated with the DPAN, and confirm that the account contains sufficient funds and/or credit to complete the wireless payment transaction. In one or more implementations, the DPAN may be associated with a card account that is associated with a given applet 210A, but there may not be a physical card corresponding to the DPAN, such as, for example, one or more of the monetary accounts created with the financial institution for the fund transfer system.

In one or more implementations, the applets 210A-N may also be provisioned with an attribute that indicates the type of communication protocol used by the applets 210A-N to communicate with a wireless transaction terminal. The types of communication protocols may include, for example, an NFC-A protocol (or Type A), an NFC-B protocol (or Type B), an NFC-F protocol (or Type F or FeliCA), a Bluetooth protocol, a Bluetooth low energy (BLE) protocol, a Zigbee protocol, a Wi-Fi protocol, or generally any communication protocol.

The NFC controller 206 may include one or more antennas and one or more transceivers for transmitting/receiving NFC communications. The NFC controller 206 may further include one or more interfaces, such as a single wire protocol interface, for coupling to the host processor 202 and/or the secure element 208. The NFC controller 206 may be able to communicate via one or more different NFC communication protocols, such as NFC-A (or Type A), NFC-B (or Type B), NFC-F (or Type F or FeliCA), and/or International Organization for Standardization (ISO)/International Electrotechnical Commission (IEC) 15693. The NFC-A protocol may be based on ISO/IEC 14443A and, e.g., may use Miller bit coding with a 100 percent amplitude modulation. The NFC-B protocol may be based on ISO/IEC 14443B and, e.g., may use variations of Manchester encoding along with a 10 percent modulation. The NFC-F protocol may be based on FeliCA JIS X6319-4 and, e.g., may use a slightly different variation of Manchester coding than the NFC-B protocol.

For explanatory purposes, the electronic device 102A is illustrated in FIG. 2 as utilizing the NFC controller 206 to communicate with a wireless transaction terminal. However, the electronic device 102A may use any wireless communication controller and/or protocol to communicate with a wireless transaction terminal, such as Bluetooth, Bluetooth low energy, Wi-Fi, Zigbee, millimeter wave (mmWave), or generally any wireless communication controller and/or protocol.

The host processor 202 may include suitable logic, circuitry, and/or code that enable processing data and/or controlling operations of the electronic device 102A. In this regard, the host processor 202 may be enabled to provide control signals to various other components of the electronic device 102A. The host processor 202 may also control transfers of data between various portions of the electronic device 102A. Additionally, the host processor 202 may enable implementation of an operating system or otherwise execute code to manage operations of the electronic device 102A. The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, one or more of the host processor 202, the memory 204, the NFC controller 206, the secure element 208, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
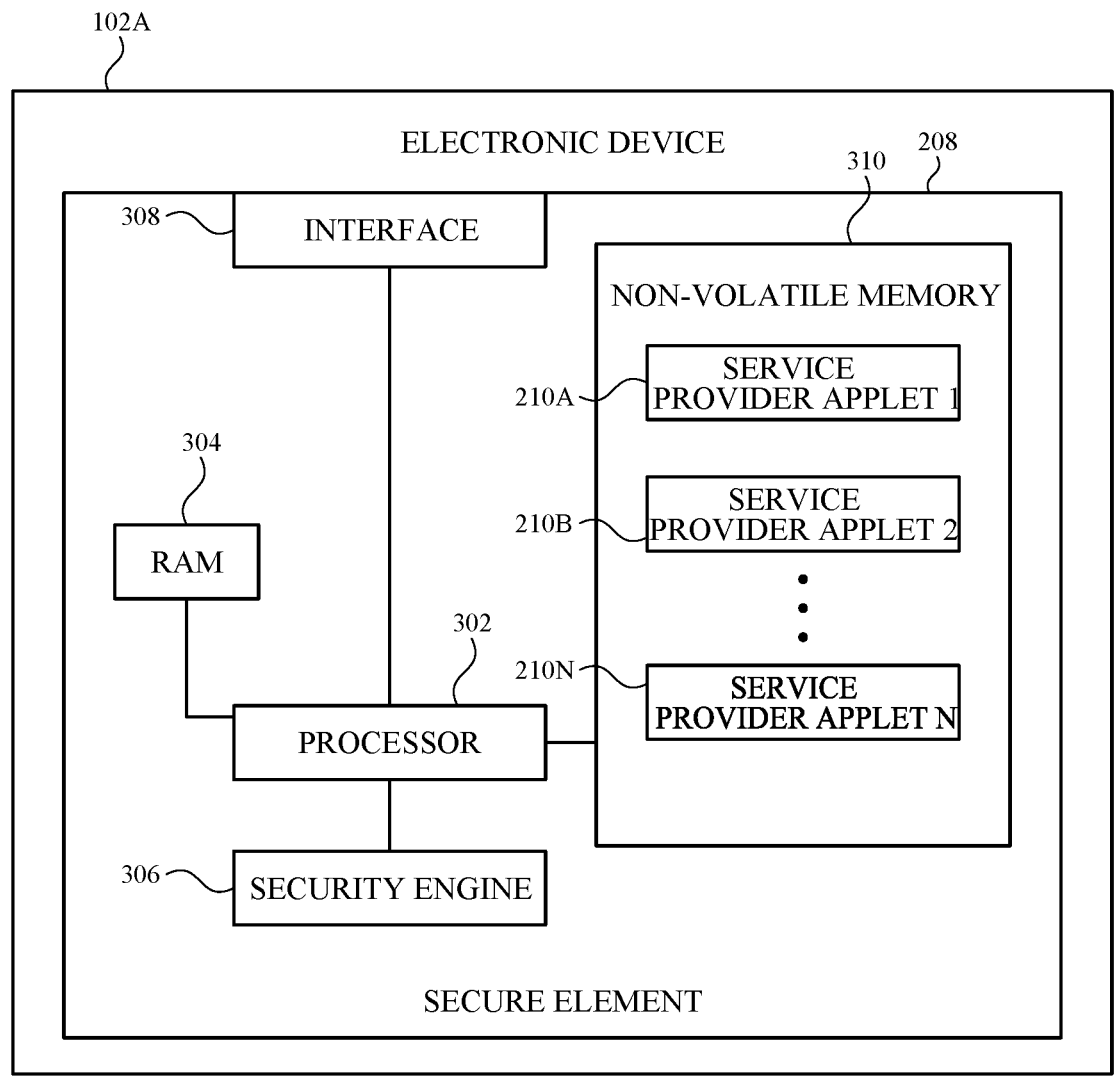
FIG. 3 illustrates an example electronic device including an example secure element that may be used in a user configurable direct transfer system in accordance with one or more implementations.

FIG. 3 illustrates an example electronic device 102A including an example secure element that may be used in a user configurable direct transfer system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The secure element 208 includes a secure processor 302, RAM 304, a security engine 306, an interface 308, and non-volatile memory 310. The RAM 304 may include one or more of static RAM (SRAM) and/or dynamic RAM (DRAM). The interface 308 may communicatively couple the security element 208 to one or more other chips (or integrated circuits, processors, etc.) in the device, such as the NFC controller 206 and/or the host processor 202. The interface 308 may be, for example, a SWP interface, a universal serial bus (USB) interface, or generally any data interface. The secure processor 302 may be, for example, a reduced instruction set computing (RISC) processor, an advanced RISC machine (ARM) processor, or generally any processing circuitry.

The security engine 306 may perform one or more security operations for the secure element 208. For example, the security engine 306 may perform cryptographic operations and/or may manage cryptographic keys and/or certificates. For example, the security engine 306 may manage one or more keys for accessing the user's encrypted transaction records. Furthermore the security engine 306 may manage a key or other security information that may be used by the electronic device 102A in the fund transfer system to sign messages transmitted to the fund transfer system server 110 and/or the financial institution server 120.

The non-volatile memory 310 may be and/or may include, for example, flash memory. The non-volatile memory 310 may store the attributes and executable code associated with the applets 210A-N. In one or more implementations, the non-volatile memory 310 may also store firmware and/or operating system executable code that is executed by the secure processor 302 to provide the execution environment for the applets 210A-N, such as a JAVA execution environment.

In one or more implementations, one or more of the secure processor 302, the RAM 304, the security engine 306, the interface 308, the non-volatile memory 310, and/or one or more portions thereof, may be implemented in software (e.g., subroutines and code), may be implemented in hardware (e.g., an ASIC, an FPGA, a PLD, a controller, a state machine, gated logic, discrete hardware components, or any other suitable devices) and/or a combination of both.

Figure 4:
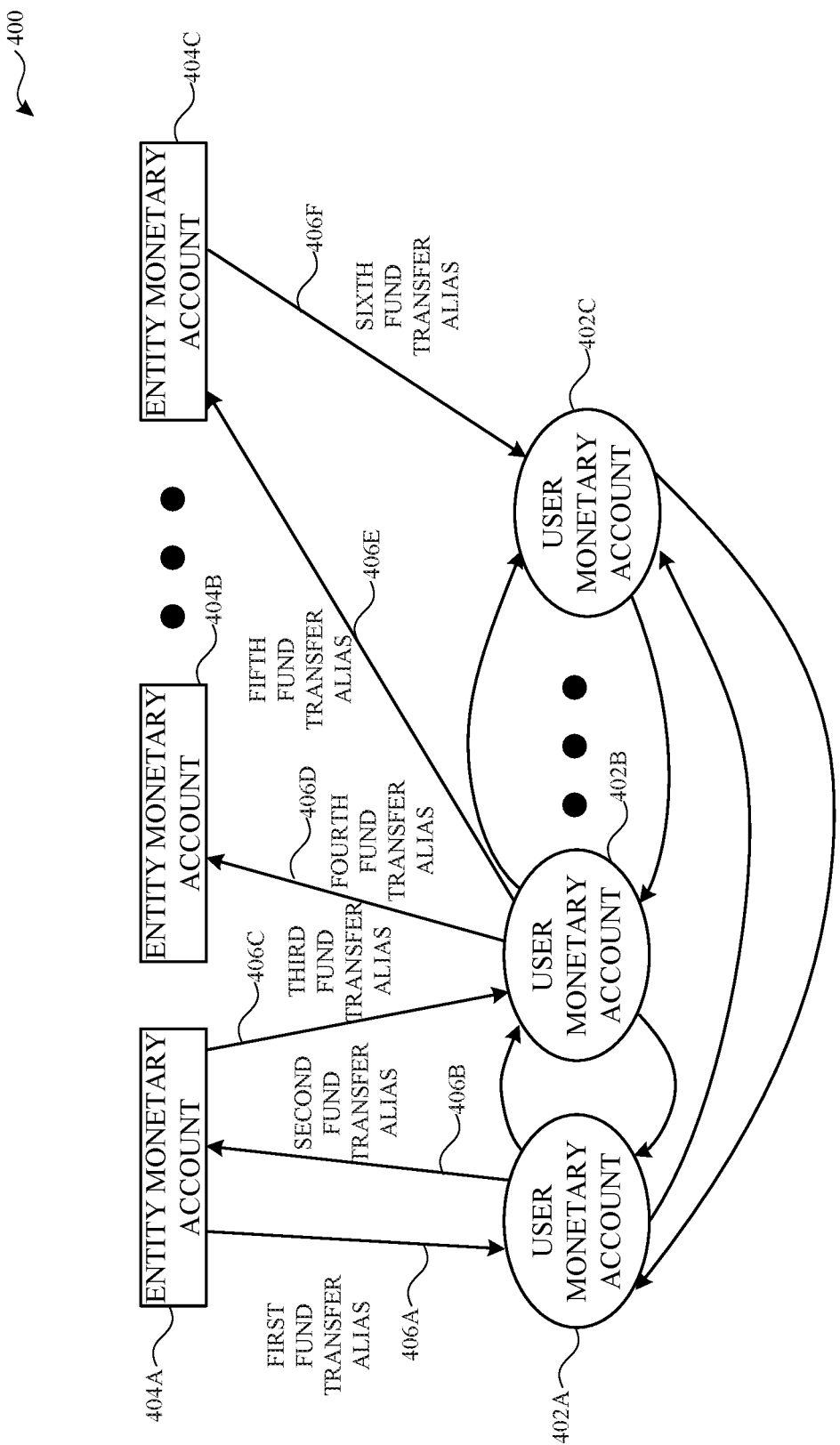
FIG. 4 illustrates a logical representation of user configurable transfers between accounts in accordance with one or more implementations.

FIG. 4 illustrates a logical representation 400 of user configurable transfers between accounts in accordance with one or more implementations. Not all of the depicted logical components may be used in all implementations, however, and one or more implementations may include additional or different logical components than those shown in the figure. Variations in the arrangement and type of the logical components may be made without departing from the spirit or scope of the claims as set forth herein. Additional logical components, different logical components, and/or fewer logical components may be provided.

The logical representation 400 includes user monetary accounts 402A-C corresponding to user accounts, and entity monetary accounts 404A-C corresponding to entity accounts, and fund transfer alias links 404A-F. The user monetary accounts 402A-C and/or the entity monetary accounts 404A-C may be monetary accounts, such as bank accounts, held by the financial institution corresponding to the financial institution server 120. In one or more implementations, the user and entity monetary accounts 402A-C, 404A-C may be for example, FDIC insured bank accounts. The user and entity monetary accounts 402A-C, 404A-C may have corresponding identifiers, such as bank account numbers (e.g., routing numbers and/or account numbers), that may be used by the financial institution server 120 to identify the monetary accounts 402A-C, 404A-C. In one or more implementations, the user monetary accounts 402A-C may correspond to individual users while the entity monetary accounts 404A-C may correspond to entities, such as organizations, businesses, governments, and the like. However, in some implementations, the user monetary accounts 402A-C and entity monetary accounts 404A-C can be any form(s)/type(s) of account that can be used to store and/or track value.

The user monetary accounts 402A-C may be capable of transferring funds to other user accounts 402A-C, such as via peer-to-peer transfers. The user monetary accounts 402A-C may also receive disbursements of funds from one or more of the entity accounts 404A-C, and may have funds charged (e.g., withdrawn) by one or more of the entity accounts 404A-C. The entity monetary accounts 404A-C may be capable of disbursing funds into one or more of the user monetary accounts 402A-C and charging funds (e.g., withdrawing funds) from one or more of the user monetary accounts 402A-C. In one or more implementations, one or more of the entity monetary accounts 404A-C may also be capable of disbursing and/or charging funds to another of the entity monetary accounts 404A-C. In one or more implementations, the user monetary accounts 402A-C may not be capable of disbursing funds to, or charging funds from, another monetary account.

The user monetary accounts 402A-C and the entity monetary accounts 404A-C may effectively be the same type of monetary accounts, e.g., bank accounts; however, there may be different regulations, limitations and/or restrictions associated with the user monetary accounts 402A-C and the entity monetary accounts 404A-C that may be implemented, for example, by the financial institution server 120 and/or the fund transfer system server 110. For example, entity monetary accounts 404A-C may be allowed to have a higher balance than the user monetary accounts 402A-C and/or the entity monetary accounts 404A-C may be allowed to perform more fund transfers per day than the user monetary accounts 402A-C. Since the entity monetary accounts 404A-C have fewer restrictions and/or limitations than the user monetary accounts 402A-C, a more stringent identification validation process may be required for establishing and/or activating an entity monetary account 404A as opposed to a user monetary account 402A. An example process of creating an entity monetary account is discussed further below with respect to FIG. 5.

When a user establishes a fund transfer type, such as a disbursement or a charge, with a particular entity a fund transfer alias is generated by the fund transfer system server 110 that can subsequently be used to initiate a fund transfer having the fund transfer type between the user's monetary account and the particular entity's monetary account. An example process of generating a fund transfer alias is discussed further below with respect to FIG. 6. The generation of the fund transfer alias allows the particular entity to initiate a fund transfer with the user's monetary account having the fund transfer type, such as a disbursement, without having any specific information regarding the user's monetary account, such as the identifier of the user's monetary account. An example process of performing a fund transfer using a fund transfer alias is discussed further below with respect to FIG. 7.

In FIG. 4, the user associated with user monetary account 402A has established, e.g. via the electronic device 102A, a first fund transfer alias link 406A for disbursements by the entity monetary account 404A, e.g. using a first fund transfer alias, and a second fund transfer alias link 406B for charges by the entity monetary account 404A, e.g. using a second fund transfer alias. The user associated with the user monetary account 402B has established, e.g. via the electronic device 102B, a third fund transfer alias link 406C for disbursements by the entity monetary account 404A, e.g. using the third fund transfer alias, a fourth fund transfer alias link 406D for charges by the entity monetary account 404B, e.g. using the fourth fund transfer alias, and a fifth fund transfer alias link 406E for charges by the entity monetary account 404C, e.g. using the fifth fund transfer alias. The user associated with the user monetary account 402C has established, e.g. via the electronic device 102C, a sixth fund transfer alias link 406F for charges by the entity monetary account 404C, e.g. using the sixth fund transfer alias.

Thus, a separate fund transfer alias is generated for each type of transaction with a particular entity monetary account. Further, a separate fund transfer alias is generated for fund transfers with each separate entity monetary account. The fund transfer aliases may be, for example, randomly generated unique identifiers that are generated separately from (e.g., not based on) the identifiers of the monetary accounts 402A-C, 404A-C.

In one or more implementations, the users' associated with the user monetary accounts 402A-C may be able to individually establish and deactivate/remove/delete their respective fund transfer alias links 406A-F with each of the entity monetary accounts 404A-C. For example, the fund transfer system server 110 may provide a user interface to the electronic devices 102A-C that allow the users to individually establish and deactivate/remove/delete different types of fund transfers with different entities. The fund transfer system server 110 may be able to immediately establish a fund transfer alias for a given fund transfer type with a given entity, and/or immediately deactivate/remove a fund transfer alias for a given fund transfer type with a given entity, e.g. responsive to a user request for the same.

Figure 5:
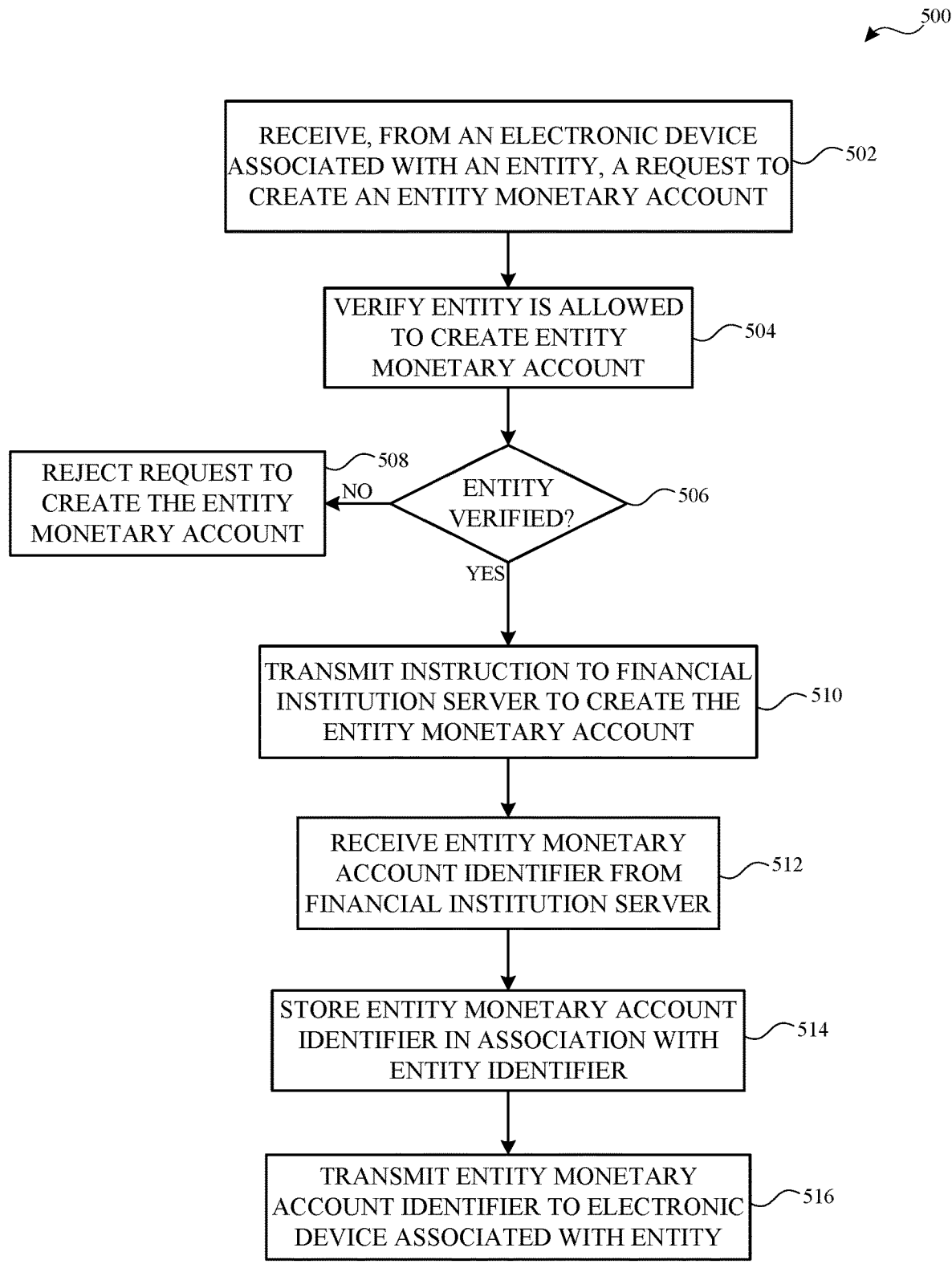
FIG. 5 illustrates a flow diagram of an example process of creating an entity monetary account in accordance with one or more implementations.

FIG. 5 illustrates a flow diagram of an example process 500 of creating an entity monetary account in accordance with one or more implementations. For explanatory purposes, the process 500 is primarily described herein with reference to the fund transfer system server 110 and the electronic device 102B of FIG. 1. However, the process 500 is not limited to the fund transfer system server 110 and the electronic device 102B of FIG. 1, and one or more blocks (or operations) of the process 500 may be performed by one or more other components or chips of the fund transfer system server 110 and/or the electronic device 102B. The fund transfer system server 110 also is presented as an exemplary device and the operations described herein may be performed by any suitable device or devices. Further for explanatory purposes, the blocks (or operations) of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations. Further, one or more additional operations can be performed.

The process 500 is initiated when the fund transfer system server 110 receives, from an electronic device associated with an entity, such as the electronic device 102B, a request to create an entity monetary account (502). For example, a user or administrator associated with the entity may utilize an application or web interface to initiate a request to create an entity monetary account. The request may include, for example, an entity identifier and/or a name of the user or administrator at the entity that is requesting that the entity monetary account be created.

Upon receiving the request, the fund transfer system server 110 verifies/validates that the entity is allowed to create an entity monetary account (504). For example, the fund transfer system server 110 and/or the financial institution server 120 may perform one or more verification processes to verify that the entity is allowed to create an entity monetary account with the financial institution. In one or more implementations, the one or more verification processes may be performed before the request to create the entity monetary account can be initiated. As previously discussed, since entity monetary accounts have fewer restrictions than user monetary accounts, the entity monetary account verification processes may be more rigorous than those employed for user monetary accounts.

If the fund transfer system server 110 determines that the entity is not verified (506), e.g. is not allowed to create an entity monetary account, the fund transfer system server 110 rejects the request to create the entity monetary account (508). In one or more implementations, if the verification processes are pre-requisites for requesting that the entity monetary account be created then the request may not be transmitted when the entity is not verified. If the fund transfer system server 110 determines that the entity is verified (506), e.g. the entity is allowed to create an entity monetary account, the fund transfer system server 110 transmits an instruction to the financial institution server 120 to create the entity monetary account (510). In one or more implementations, the instruction may include the name of the user at the entity that is requesting that the entity monetary account be created. For example, the fund transfer system server 110 may make an API call to the financial institution server 120.

The fund transfer system server 110 receives, from the financial institution server 120, an entity monetary account identifier for the entity monetary account (512). The fund transfer system server 110 stores the entity monetary account identifier in association with the entity identifier, such as in the fund transfer system data store 125 (514). The fund transfer system server 110 transmits, to the electronic device 102B associated with the entity, the entity monetary account identifier (516). In conjunction with transmitting the entity monetary account identifier, the fund transfer system server 110 facilitates issuing a signing certificate to the entity such that the entity can sign subsequent requests to transfer funds to/from the entity monetary account. The entity may add funds to the entity monetary account, such as by interacting directly with the financial institution server 120.

Figure 6:
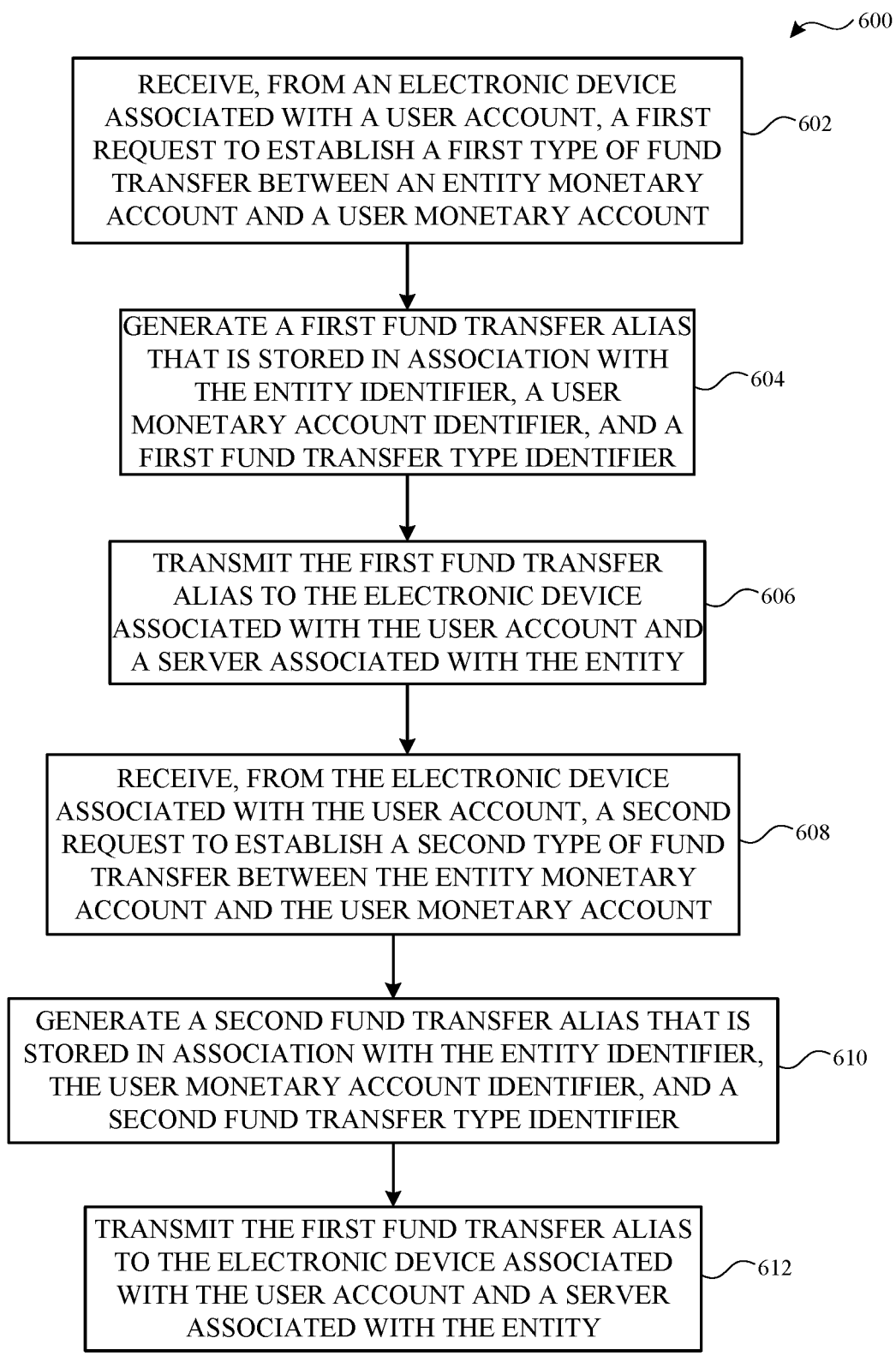
FIG. 6 illustrates a flow diagram of an example process of establishing different types of user configurable transfers between an entity monetary account and a user monetary account in accordance with one or more implementations.

FIG. 6 illustrates a flow diagram of an example process 600 of establishing different types of user configurable transfers between an entity monetary account and a user monetary account in accordance with one or more implementations. For explanatory purposes, the process 600 is primarily described herein with reference to the fund transfer system server 110 and the electronic device 102A of FIG. 1. However, the process 600 is not limited to the fund transfer system server 110 and the electronic device 102A of FIG. 1, and one or more blocks (or operations) of the process 600 may be performed by one or more other components or chips of the fund transfer system server 110 and/or the electronic device 102A. The fund transfer system server 110 also is presented as an exemplary device and the operations described herein may be performed by any suitable device or devices. Further for explanatory purposes, the blocks (or operations) of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations. Further, one or more additional operations can be performed.

The process 600 is initiated when the fund transfer system server 110 receives, from the electronic device 102A associated with a user account of the fund transfer system, a first request to establish a first type of fund transfer between an entity monetary account and the user monetary account corresponding to the user account (602). For example, a user interacting with the electronic device 102A may interact with an application or web page corresponding to an entity to indicate that they would like to establish the first type of fund transfer with the entity. The first type of fund transfer may be, for example, a disbursement (e.g., getting paid by the entity) or a charge (e.g., paying the entity). The first request may include, for example, the entity identifier of the entity and a first fund transfer type identifier that identifies the type of fund transfer, e.g., disbursement or charge.

The fund transfer system server 110 generates a first fund transfer alias that is stored, e.g. in the fund transfer system data store 125, in association with the entity identifier, the user monetary account identifier associated with the user account and the first fund transfer type identifier (604). The first fund transfer alias may be generated independently of the entity monetary account identifier and the user monetary account identifier. The fund transfer system server 110 transmits the first fund transfer alias to the electronic device 102A associated with the user and to the entity server 104A associated with the entity (606). The first fund transfer alias may then be used by the entity server 104A to initiate the first type of fund transfer between the entity monetary account and the user monetary account, as is discussed further below with respect to FIG. 7.

The fund transfer system server 110 may receive, from the electronic device 102A associated with the user account of the fund transfer system, a second request to establish a second type of fund transfer between the entity monetary account and the user monetary account corresponding to the user account (608). For example, a user interacting with the electronic device 102A may interact with an application or web page corresponding to an entity to indicate that they would like to establish the second type of fund transfer with the entity. The second type of fund transfer may be, for example, a disbursement (e.g., getting paid by the entity), or a charge (e.g., paying the entity), but different than the first type of fund transfer with the entity. The second request may include, for example, the entity identifier of the entity and a second fund transfer type identifier that identifies the type of fund transfer, e.g. disbursement or charge.

The fund transfer system server 110 generates a second fund transfer alias that is stored, e.g. in the fund transfer system data store 125, in association with the entity identifier, the user monetary account identifier associated with the user account and the second fund transfer type identifier (610). The second fund transfer alias may be generated independently of the first fund transfer alias, the entity monetary account identifier, and the user monetary account identifier. The fund transfer system server 110 transmits the second fund transfer alias to the electronic device 102A associated with the user and to the entity server 104A associated with the entity (612). The second fund transfer alias may then be used by the entity server 104A to initiate the second type of fund transfer between the entity monetary account and the user monetary account, as is discussed further below with respect to FIG. 7.

The user may also establish one or more additional fund transfer aliases with respect to the entity and/or different entities, and/or may deactivate/remove the first or second fund transfer aliases. Thus, the subject system creates separate fund transfer aliases for each type of fund transfer with respect to the entity. Further, the subject system creates separate fund transfer aliases for each entity. In this manner, the user is able to individually configure each different type of fund transfer with each different entity.

Figure 7:
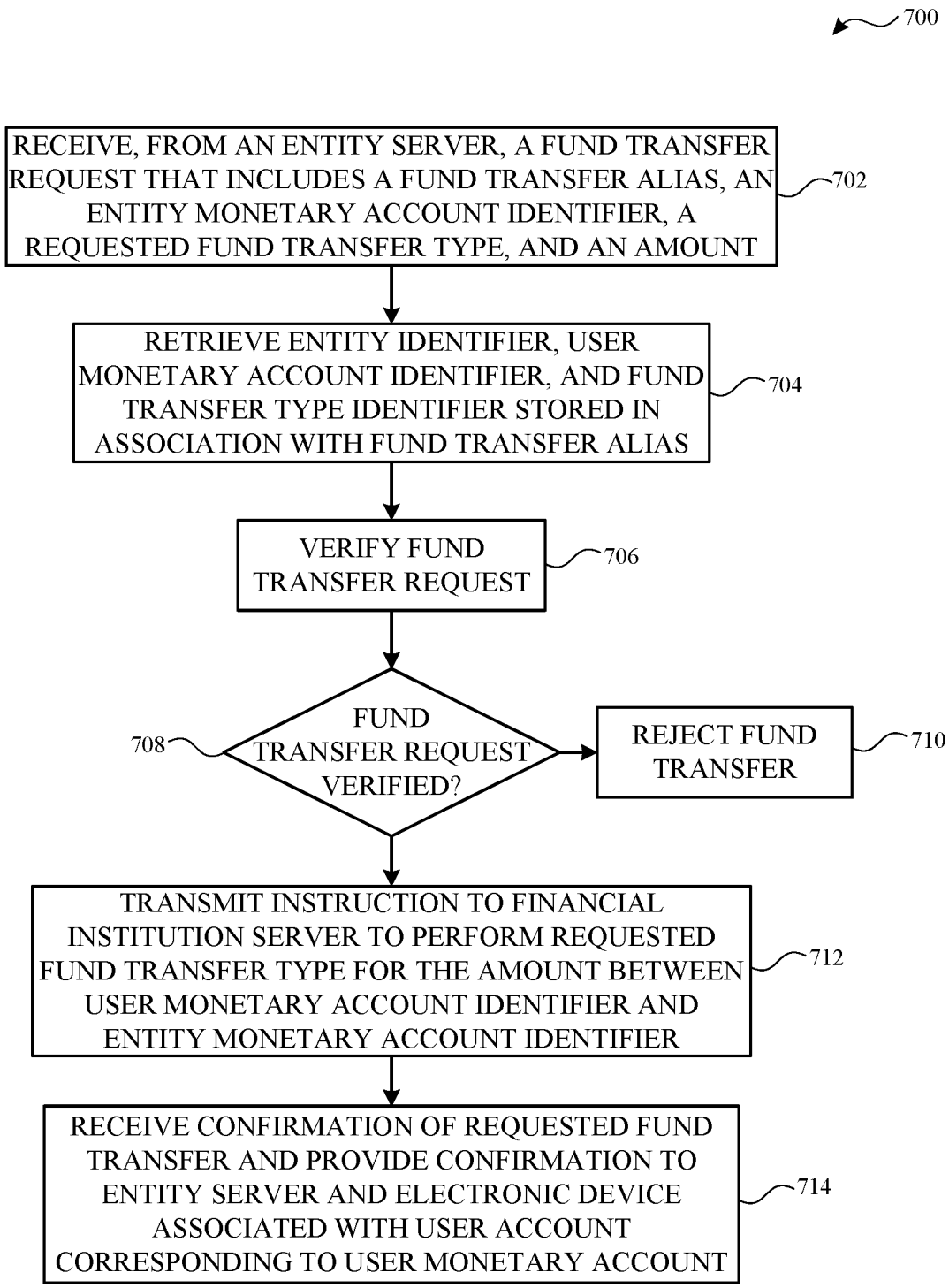
FIG. 7 illustrates a flow diagram of an example process of a user configurable transfer in accordance with one or more implementations.

FIG. 7 illustrates a flow diagram of an example process 700 of a user configurable transfer in accordance with one or more implementations. For explanatory purposes, the process 700 is primarily described herein with reference to the fund transfer system server 110 and the entity server 104A of FIG. 1. However, the process 700 is not limited to the fund transfer system server 110 and the entity server 104A of FIG. 1, and one or more blocks (or operations) of the process 700 may be performed by one or more other components or chips of the fund transfer system server 110 and/or the entity server 104A. The fund transfer system server 110 also is presented as an exemplary device and the operations described herein may be performed by any suitable device or devices. Further for explanatory purposes, the blocks (or operations) of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations. Further, one or more additional operations can be performed.

The process 700 is initiated when the fund transfer system server 110 receives, from an entity server 104A, a fund transfer request that includes a fund transfer alias, an entity monetary account identifier for the entity, a requested fund transfer type, and an amount of the fund transfer (702). For example, the entity server 104A may wish to disburse funds from the entity's monetary account into a monetary account of the user. In one or more implementations, the request may be signed with a certificate that was issued to the entity when the entity created the entity monetary account. In one or more implementations, a user may initiate contact with an entity, such as a user contacting an insurance agency, and the entity may transmit the fund transfer request responsive to the user's call, such as to deposit money (e.g. for an insurance claim) directly into the user's monetary account.

The fund transfer system server 110 retrieves, such as from the fund transfer system data store 125, an entity identifier, a user monetary account identifier, and a fund transfer type identifier that are stored in association with the received fund transfer alias (704). The fund transfer system server 110 verifies the fund transfer request based on the information received from the entity server 104A and the corresponding information retrieved from the fund transfer system data store 125 (706). For example, the fund transfer system server 110 may verify the certificate used by the entity server 104A to sign the request, may verify that the received entity monetary account identifier corresponds to the entity monetary account identifier stored in association with the entity identifier, such as in the fund transfer system data store 125, may verify that entity identifier retrieved in association with the fund transfer alias matches the entity identifier of entity corresponding to the entity server 104A, and may verify that the requested fund transfer type corresponds to the fund transfer type stored in association with the fund transfer alias.

If the fund transfer system server 110 determines that the fund transfer request is not verified (708), the fund transfer system server 110 rejects the fund transfer request (710) and may transmit a message to the entity server 104A indicating the same. If the fund transfer system server 110 determines that the fund transfer request is verified (708), the fund transfer system server 110 transmits an instruction to the financial institution server 120 to perform the requested fund transfer type for the amount between the user monetary account corresponding to the user monetary account identifier stored in association with the alias and the entity monetary account corresponding to the entity monetary account identifier included in the request (712). For example, the fund transfer system server 110 may make an API call to the financial institution server 120 with the monetary account identifiers and the amount.

After the financial institution server 120 completes the requested fund transfer, the fund transfer system server 110 receives, from the financial institution server 120, confirmation that the requested fund transfer has been completed, and the fund transfer system server 110 provides the confirmation to the entity server 104A and to the electronic device 102A associated with the user account corresponding to the user monetary account (714). In one or more implementations, the confirmation from the financial institution server 120 may include and/or may be in the form of, a cryptographic signature which informs the fund transfer system 110 that the funds have moved and which also may serve as non-repudiation, e.g. for the transfer.

In one or more implementations, the confirmation of the fund transfer may be provided to the electronic device 102A associated with the user account corresponding to the user monetary account by way of a distributed (e.g. cloud) storage system. For example, the fund transfer system server 110 may push a transaction record corresponding to the fund transfer to a distributed storage system, and the electronic device 102A may retrieve the transaction record from the distributed storage system.

Figure 8:
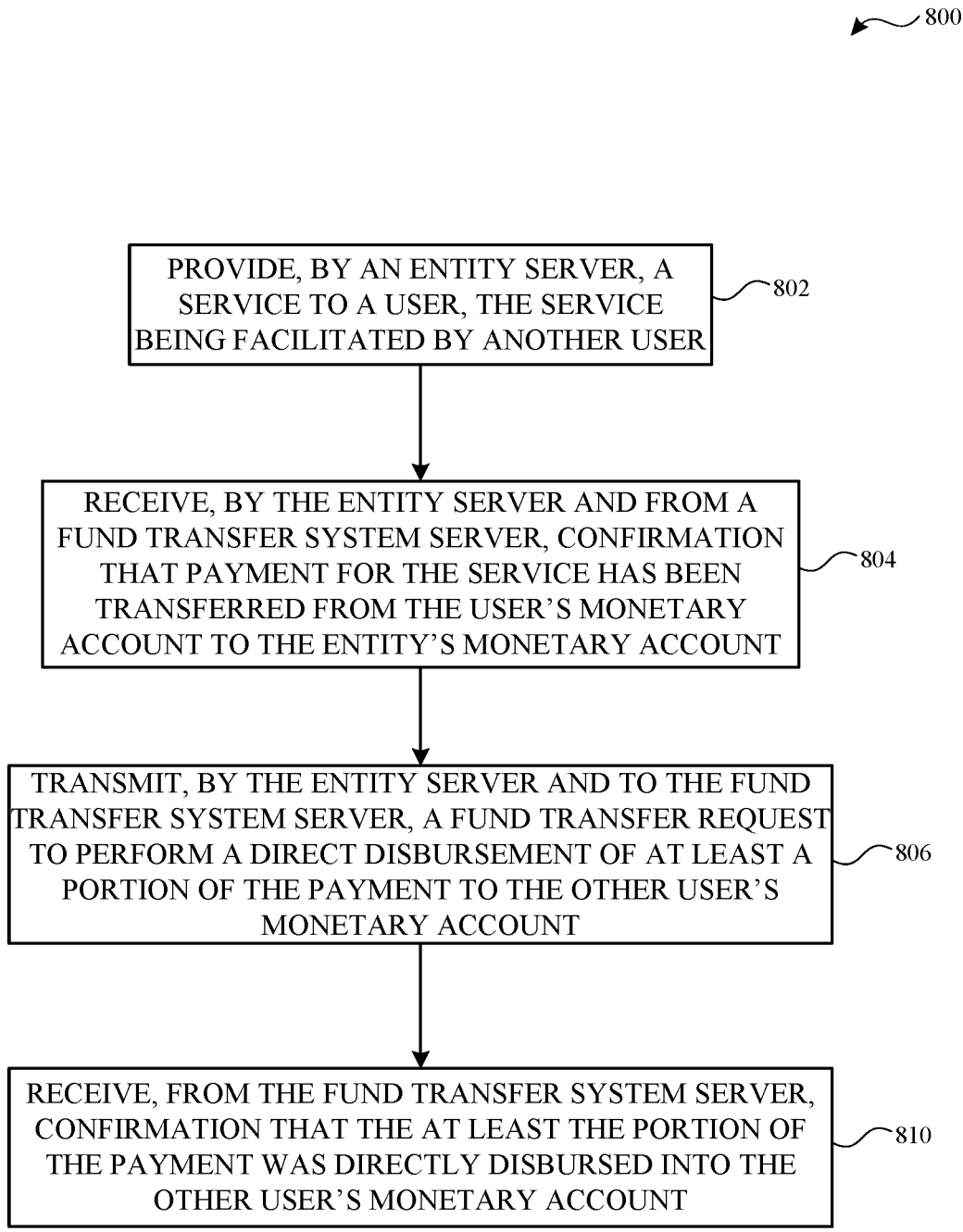
FIG. 8 illustrates a flow diagram of an example process of a triggered user configurable transfer in accordance with one or more implementations.

FIG. 8 illustrates a flow diagram of an example process 800 of a triggered user configurable transfer in accordance with one or more implementations. For explanatory purposes, the process 800 is primarily described herein with reference to the fund transfer system server 110 and the entity server 104A of FIG. 1. However, the process 800 is not limited to the fund transfer system server 110 and the entity server 104A of FIG. 1, and one or more blocks (or operations) of the process 800 may be performed by one or more other components or chips of the fund transfer system server 110 and/or the entity server 104A. The fund transfer system server 110 also is presented as an exemplary device and the operations described herein may be performed by any suitable device or devices. Further for explanatory purposes, the blocks (or operations) of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations. Further, one or more additional operations can be performed.

The process 800 is initiated when an entity server 104A provides a service to a user, where the service is facilitated by another user, e.g. a facilitating user (802). For example, the entity server 104A may provide (e.g. coordinate) a ride service for which the facilitating user is a driver. Thus, the entity server 104A may receive payment for the ride from the user and the entity server 104A may provide a portion of the payment to the facilitating user for facilitating the performance of the service. Thus, the entity server 104A receives, from the fund transfer system server 110 and/or the financial institution server 120, confirmation that payment for the service has been directly transferred from the user's monetary account to the entity's monetary account, such as by using a first fund transfer alias configured by the user for charges by the entity (804). In one or more implementations, the payment may be received after completion, upon completion, and/or before completion of the service.

The receipt of the confirmation of the payment for the service triggers the entity server 104A to transmit, to the fund transfer system server 110, a fund transfer request to perform a direct disbursement of at least a portion of the received payment to the facilitating user's (i.e., the other user's) monetary account (806). The fund transfer request may include a second fund transfer alias that was previously configured by the facilitating user (via the fund transfer system server 110) to allow the entity server 104A to disburse funds into the user monetary account of the facilitating user.

After the fund transfer request is complete, the entity server 104A receives, from the fund transfer system server 110, confirmation that the at least the portion of the payment was directly disbursed into the facilitating user's monetary account (810). In this manner, the entity server 104A can pay the facilitating user for facilitating (or providing) the service (and/or pay the facilitating user for any tips received for the service) immediately upon receiving payment from the user who received the service (or close in time to receiving the payment), without knowing the account identifier of the facilitating user's monetary account, and without involving any intermediaries outside of the financial institution. Thus, the facilitating user may receive the payment in their monetary account in real time or near real time (e.g., immediately, within minutes, within hours, within a day, etc.) upon completing the service.

Figure 9:
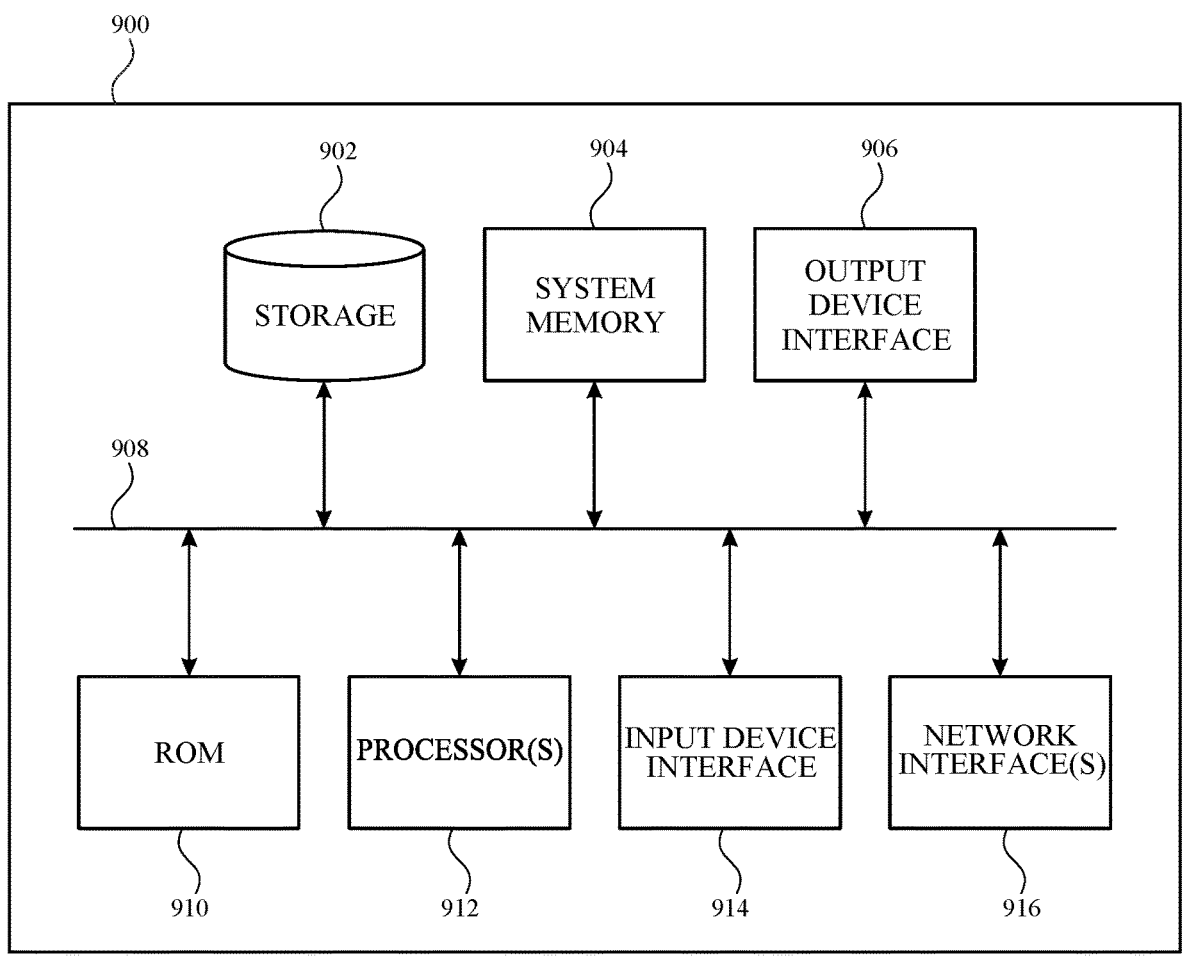
FIG. 9 conceptually illustrates an electronic system with which aspects of the subject technology may be implemented in accordance with one or more implementations.

FIG. 9 conceptually illustrates an electronic system 900 with which one or more implementations of the subject technology may be implemented. The electronic system 900 can be, and/or can be a part of, one or more of the electronic devices 102A-C, and/or one or more of the servers 104A-C, 110, 120 shown in FIG. 1. The electronic system 900 may include various types of computer readable media and interfaces for various other types of computer readable media. The electronic system 900 includes a bus 908, one or more processing unit(s) 912, a system memory 904 (and/or buffer), a ROM 910, a permanent storage device 902, an input device interface 914, an output device interface 906, and one or more network interfaces 916, or subsets and variations thereof.

The bus 908 collectively represents all system, peripheral, and chipset buses that communicatively connect the numerous internal devices of the electronic system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are needed by the one or more processing unit(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a disk drive, flash drive, and the like) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processing unit(s) 912 may need at runtime. In one or more implementations, the processes of the subject disclosure are stored in the system memory 904, the permanent storage device 902, and/or the ROM 910. From these various memory units, the one or more processing unit(s) 912 retrieves instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called "cursor control devices"). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 908 also couples the electronic system 900 to one or more networks and/or to one or more network nodes through the one or more network interface(s) 916. In this manner, the electronic system 900 can be a part of a network of computers (such as a LAN, a wide area network ("WAN"), or an Intranet, or a network of networks, such as the Internet. Any or all components of the electronic system 900 can be used in conjunction with the subject disclosure.

As described above, one aspect of the present technology is the gathering and use of data available from various sources to improve the user configurable direct transfer system. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to establish financial accounts, such as bank accounts, for users. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user configurable direct transfers, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, fund transfer aliases can be configured based on non-personal information data or a bare minimum amount of personal information, such as the content being requested by the device associated with a user, other non-personal information available, or publicly available information.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   providing, by an entity server, a service to a user, the service being facilitated by an other user;
   receiving, by the entity server and from a transfer system server, confirmation that payment for the service has been directly transferred from a first account associated with the user to a second account associated with the entity server, the direct transfer of the payment being performed using a first transfer alias that is distinct from a first account identifier of the first account and a second account identifier of the second account; and
   transmitting, by the entity server and to the transfer system server, a request to perform a direct disbursement of at least a portion of the payment from the second account associated with the entity server to a third account associated with the other user, the request comprising a third account identifier and a second transfer alias that is distinct from the first, second, and third account identifiers and the request being exclusive of the third account identifier, wherein transmitting the request to perform the direct disbursement is triggered by receiving the confirmation that the payment for the service has been directly transferred, wherein the first, second, and third accounts are held by a financial institution and the direct transfer of the payment and the direct disbursement of the at least the portion of the payment are performed at the financial institution without facilitation from a merchant acquirer or a payment network.

2. The method of claim 1, wherein the first transfer alias is established responsive to a first request received from a first electronic device associated with the user, the second transfer alias is established responsive to a second request received from a second electronic device associated with the other user, and the first and second transfer aliases are provided to the entity server without providing the second and third account identifiers to the entity server.

3. The method of claim 1, wherein the at least the portion of the direct disbursement is available in the third account of the other user immediately upon completion of the service.

4. The method of claim 1, wherein the entity server receives the confirmation that the payment for the service has been directly transferred prior to completion of providing the service.

5. The method of claim 1, wherein the transfer system server is distinct from the financial institution.

6. The method of claim 1, wherein the first transfer alias is distinct from the second transfer alias.

7. The method of claim 1, wherein the service comprises a rideshare service.

8. A non-transitory machine readable medium comprising code that, when executed by at least one processor causes the at least one processor to perform operations comprising:
   providing, by an entity server, a service to a user, the service being facilitated by an other user;
   receiving, by the entity server and from a transfer system server, confirmation that payment for the service has been provided; and
   transmitting, by the entity server and to the transfer system server, a request to perform a direct disbursement of at least a portion of the payment from a first account associated with the entity server to a second account associated with the other user, the request comprising a first account identifier and a first alias that is distinct from the first account identifier and the request being exclusive of a second account identifier, wherein transmitting the request to perform the direct disbursement is triggered by receiving the confirmation that the payment for the service has been directly transferred, wherein the first and second accounts are held by a financial institution and the direct transfer of the payment and the direct disbursement of the at least the portion of the payment are performed at the financial institution without facilitation from a merchant acquirer or a payment network.

9. The non-transitory machine readable medium of claim 8, wherein the first alias is established responsive to a first request received from a first electronic device associated with the user, a second alias is established responsive to a second request received from a second electronic device associated with the other user, and the first and second transfer aliases are provided to the entity server without providing the second and third account identifiers to the entity server.

10. The non-transitory machine readable medium of claim 8, wherein the at least the portion of the direct disbursement is available in the third account of the other user immediately upon completion of the service.

11. The non-transitory machine readable medium of claim 8, wherein the entity server receives the confirmation that the payment for the service has been directly transferred prior to completion of providing the service.

12. The non-transitory machine readable medium of claim 8, wherein the transfer system server is distinct from the financial institution.

13. The non-transitory machine readable medium of claim 8, wherein the first alias is distinct from a second alias.

14. The method of claim 1, wherein the service comprises a rideshare service.

15. A device comprising:
    a memory; and
    at least one processor configured to:
       provide, by an entity server, a service to a user, the service being facilitated by an other user;
       receive, by the entity server and from a transfer system server, confirmation that payment for the service has been provided; and transmit, by the entity server and to the transfer system server, a request to perform a direct disbursement of at least a portion of the payment from a first account associated with the entity server to a second account associated with the other user, the request comprising a first account identifier and a first alias that is distinct from the first account identifier and the request being exclusive of a second account identifier, wherein transmission of the request to perform the direct disbursement is triggered by receipt of the confirmation that the payment for the service has been directly transferred, wherein the first and second accounts are held by a financial institution and the direct transfer of the payment and the direct disbursement of the at least the portion of the payment are performed at the financial institution without facilitation from a merchant acquirer or a payment network.

16. The device of claim 15, wherein the first alias is established responsive to a first request received from a first electronic device associated with the user, the second transfer alias is established responsive to a second request received from a second electronic device associated with the other user, and the first and second transfer aliases are provided to the entity server without providing the second and third account identifiers to the entity server.

17. The device of claim 15, wherein the at least the portion of the direct disbursement is available in the third account of the other user immediately upon completion of the service.

18. The device of claim 15, wherein the entity server receives the confirmation that the payment for the service has been directly transferred prior to completion of providing the service.

19. The device of claim 15, wherein the transfer system server is distinct from the financial institution.

20. The device of claim 15, wherein the first alias is distinct from the second alias.

* * * * *